US008873670B2

United States Patent
Latouche et al.

(10) Patent No.: US 8,873,670 B2
(45) Date of Patent: Oct. 28, 2014

(54) INSERTION OF A SECONDARY BINARY INFORMATION STREAM INTO A MAIN SYMBOL STREAM OF A DIGITAL MODULATION

(75) Inventors: Gilles Latouche, Fonienay le Fleury (FR); Frédéric Rousseau, Montigny-le-Bretonneux (FR)

(73) Assignee: Cassidian SAS, ELANCOURT Cedex (FR)

( * ) Notice: Subject to any disclaimer, the term of this patent is extended or adjusted under 35 U.S.C. 154(b) by 1389 days.

(21) Appl. No.: 11/575,180

(22) PCT Filed: Sep. 12, 2005

(86) PCT No.: PCT/EP2005/010570
§ 371 (c)(1),
(2), (4) Date: Mar. 13, 2007

(87) PCT Pub. No.: WO2006/029907
PCT Pub. Date: Mar. 23, 2006

(65) Prior Publication Data
US 2008/0043871 A1    Feb. 21, 2008

(30) Foreign Application Priority Data

Sep. 15, 2004    (FR) .................................. 04 09792

(51) Int. Cl.
*H04L 27/00*    (2006.01)
*H04B 1/38*    (2006.01)
*H04L 27/18*    (2006.01)

(52) U.S. Cl.
CPC ................................. *H04L 27/186* (2013.01)
USPC ........... 375/295; 375/302; 375/219; 375/222; 375/223

(58) Field of Classification Search
USPC ................. 375/219, 222, 223, 259, 261, 268, 267,375/271, 272, 274, 275, 279, 282, 283, 284, 375/295, 300, 301, 302, 303, 304, 305, 316, 375/324, 346, 348, 308–309, 322, 329, 332, 375/340, 239; 341/50, 51, 143; 380/217, 380/216, 214, 210
See application file for complete search history.

(56) References Cited

U.S. PATENT DOCUMENTS

| 2,510,059 A | 6/1950 | Black |
| 3,382,629 A | 5/1968 | Reutlinger |

(Continued)

FOREIGN PATENT DOCUMENTS

| EP | 0 731 588 A1 | 9/1996 |
| EP | 0 773 646 A2 | 5/1997 |

(Continued)

OTHER PUBLICATIONS

Farag et al, Chapter 4 Digital Modulation, Kluwer Academic Publishers, pp. 1-28.*

(Continued)

*Primary Examiner* — Sam K Ahn
*Assistant Examiner* — Linda Wong
(74) *Attorney, Agent, or Firm* — Miller, Matthias & Hull LLP

(57) ABSTRACT

There is disclosed a method of inserting a secondary stream of binary information into a main symbol stream of at least one standard digital modulation. The stream to be transmitted resulting from the insertion of the secondary stream in the main stream is a symbol stream of a modified digital modulation. The stream to be transmitted has the same symbol rate as the main stream. The sequence of symbols of the stream to be transmitted is encoded according, cumulatively, to a first condition over at least two consecutive symbols of the main stream, on the one hand; and to a second condition on a current bit or a plurality of current bits of the secondary stream, on the other hand.

24 Claims, 4 Drawing Sheets

(56) References Cited

U.S. PATENT DOCUMENTS

| | | | |
|---|---|---|---|
| 4,525,846 A | 6/1985 | Bremer et al. | |
| 5,841,816 A * | 11/1998 | Dent et al. | 375/331 |
| 6,018,325 A | 1/2000 | Lundgren | |
| 6,373,903 B1 | 4/2002 | Wynn | |
| 6,426,978 B1 | 7/2002 | Bottomley et al. | |
| 7,016,657 B2 * | 3/2006 | Boariu | 455/102 |
| 7,394,869 B2 * | 7/2008 | Jensen et al. | 375/302 |
| 7,609,610 B2 * | 10/2009 | Abe et al. | 370/204 |
| 8,009,761 B2 * | 8/2011 | Lai et al. | 375/296 |
| 2002/0106032 A1 * | 8/2002 | Navarro et al. | 375/259 |
| 2004/0037376 A1 * | 2/2004 | Higure | 375/344 |
| 2007/0211831 A1 * | 9/2007 | Wilhelmsson | 375/329 |
| 2008/0311920 A1 * | 12/2008 | Xu et al. | 455/450 |

FOREIGN PATENT DOCUMENTS

| | | | | |
|---|---|---|---|---|
| EP | 0773646 A2 * | 5/1997 | | H04L 5/04 |
| WO | WO 02/096051 A1 | 11/2002 | | |
| WO | WO 03/005652 A1 | 1/2003 | | |

OTHER PUBLICATIONS

French Preliminary Search Report FR 0409792; report dated May 20, 2005.

European Search Report EP 05 01 0570; report dated Jul. 7, 2005.

International Search Report PCT/EP2005/010570; report dated Dec. 9, 2005.

* cited by examiner

INSERTION OF A SECONDARY BINARY INFORMATION STREAM INTO A MAIN SYMBOL STREAM OF A DIGITAL MODULATION

CROSS-REFERENCE TO RELATED APPLICATION

This is the U.S. National Phase of International Application No. PCT/FR2005/010570 filed 12 Sep. 2005, claiming priority to French Patent No. FR 04 09792, filed on 15 Sep. 2004.

FIELD OF THE DISCLOSURE

The present invention relates to digital signal processing and, more specifically, to methods of digitally modulating and demodulating a signal, and to a modulator/demodulator implementing the methods, and to a transmission device incorporating it.

BACKGROUND OF THE DISCLOSURE

It finds applications in particular in the fields of digital radio communications, for example for identifying a transmitter, a type of transmitter or a type of transmission, in order to optimize multiple-mode transceivers.

In the context of digital transmissions, there is a need to be able to insert a secondary information stream into a main information stream.

Unlike, for example, the methods of marking video signals or audio or image signals, which are known from the prior art in relation to the transformation of analogue signals or signals sampled in the time-frequency space, the proposed method works by the insertion of a secondary stream comprising binary information (bits) into a main stream comprising symbols of a digital modulation.

The document WO 02/096051 (INFINEON) discloses a method for indicating to a receiver, for which a main symbol stream of a digital modulation is intended, the type of modulation concerned. The relevant secondary information is inserted in the form of shifts in the phase of the symbols of the sequences of training symbols of the bursts of the stream to be transmitted, which are assumed to be known in advance by the receiver. A major drawback of this method is that the secondary information thus transmitted in the main stream has a very low bit rate. Another drawback is that the phase shifts of the training symbols interfere with the channel impedance matching by the receiver.

From the prior art, various methods are also known for increasing the rate of a stream of information transmitted with a standard modulation, by using the standard symbols of this modulation and certain additional symbols.

For example, U.S. Pat. No. 6,373,903 (ERICSSON) discloses a method for transmitting a first binary stream and a second binary stream. The phase transitions associated with the symbols of the first and second binary streams are combined to form a sequence of modified phase transitions, which sequence is submitted to a modulator for transmission. In an embodiment (see FIG. 2 of the document), the second stream defines modifications of the phase transitions derived from the first stream: for each phase transition of the first stream in succession, an additional phase deviation is added according to the cumulative phase states of the first stream and the cumulative phase states of the second stream. This is applied individually to each symbol of the first stream independently of the preceding or next symbol, in the first stream. The following drawbacks arise from this. The average phase error of the modulation of the first stream is permanently increased, because it is directly proportional to the value of the additional phase deviations provoked by the insertion of the second stream. The upper limit of the length of the phase trajectories of the resultant modulated signal is increased, because the greatest phase transition (standard phase transition plus the additional phase deviation) can be greater than the maximum phase transition associated with a symbol of the standard modulation. The result of this is that the spectral properties of the resultant stream are degraded compared to the first stream. The demodulation of the resultant stream is therefore less effective than the demodulation of the first stream without insertion of the second stream. Furthermore, the additional phase shifts in the resultant stream transmitted are similar when replaying one and the same sequence of the second stream.

U.S. Pat. No. 6,426,978 (ERICSSON) discloses a method based on a coded modulation technique, for transporting two binary streams. A drawback is that this method virtually imposes the encoding, and therefore the type of modulated signal transmitted. It is therefore not applicable generally, when the insertion method has to be derived from a standard digital modulation.

Finally, from the document WO 03/005652 (INTERSIL), a method is known for switching from a single-carrier modulation (for example, a binary phase shift keying (BPSK) or quaternary phase shift keying (QPSK) modulation to a multiple carrier modulation (orthogonal frequency division multiplexing, OFDM, for example) without requiring the multimode receiver to re-evaluate all the applicable transmission parameters immediately after the switch between the two modulation schemes. Nevertheless, this method imposes compatibility constraints between the single-carrier transmission and the multiple carrier transmission, in order to ensure an uninterrupted transition. These constraints concern not only the automatic gain control, the similarity of the frequency-domain spectrum of the carrier and the phase, but also the equalization of the propagation channel, assuming that the estimation of the channel impulse response by the single-carrier demodulation is reusable for the multiple carrier demodulation, as well as the sampling and filtering and time-domain synchronization. A drawback of this method originates from the fixed nature of these constraints, and in particular, the similarity constraints in the frequency and time domain between single-carrier and multiple carrier transmissions. In practice, this fixed nature limits the possibilities of pairing between the single-carrier and multiple carrier modulations, because of the diversity of the possible parameters of the existing multiple carrier modulations.

SUMMARY OF THE DISCLOSURE

It is therefore desirable to propose a method of inserting a secondary stream of binary information into a main symbol stream of a digital modulation, which overcomes some or all of the drawbacks of the abovementioned prior art.

This is why a first aspect of the present invention proposes a method of inserting a secondary stream of binary information into a main symbol stream of at least one standard digital modulation, hereinafter called standard symbols, in which the stream to be transmitted resulting from the insertion of the secondary stream in the main stream is a symbol stream of a modified digital modulation, hereinafter called modified symbols. The stream to be transmitted has the same symbol rate as the main stream. The sequence of symbols of the stream to be transmitted is encoded according, cumulatively:

to a first condition on at least two consecutive symbols of the main stream, on the one hand; and, to a second condition on a current bit or a plurality of current bits of the secondary stream, on the other hand.

This insertion method is implemented at the modulation stage. It is therefore to be applied in a modulator. The secondary stream can be extracted from the stream to be transmitted by a modified demodulator. Under certain conditions, the main stream can be extracted from the stream to be transmitted by a standard demodulator. Otherwise, it can be extracted by a modified demodulator.

In an embodiment, the encoding of the sequence of symbols of the stream to be transmitted includes substituting modified symbols for respective standard symbols, said modified symbols being derived from said respective standard symbols by an additional shift in the Fresnel plane.

For example, the additional shift in the Fresnel plane is a phase-only shift.

In an embodiment, the first condition is satisfied in case of a change of the sign of the phase transitions respectively associated with each symbol of a pair of consecutive symbols of the main stream.

In this case, it can be arranged that when the first condition is satisfied and when the current bit of the secondary stream is in a predefined one of the logical states TRUE or FALSE:
  a first modified symbol is substituted for the first standard symbol of a pair of consecutive standard symbols of the main stream, said first modified symbol being derived from said first standard symbol by an additional phase shift corresponding to a negative angle $-\alpha$ where $\alpha$ is less as an absolute value than the minimum phase transition of the standard modulation, the negative sign being defined as opposite to the sign of the phase transition associated with said first standard symbol; and
  a second modified symbol is substituted for the second symbol of said pair of standard symbols, said second modified symbol being derived from said second standard symbol by an additional phase shift of a positive angle $+\alpha$, the positive sign being defined as identical to the sign of the phase transition associated with said first standard symbol.

In another embodiment, the first condition is satisfied when, at one and the same time, the phase transitions associated with the pair of consecutive standard symbols have opposite signs, on the one hand, and neither one nor the other of these phase transitions is equal to the maximum phase transition of the standard modulation, on the other hand.

In this case, it can be arranged that, when the first condition is satisfied:
  a first modified symbol is substituted for the first standard symbol of a pair of consecutive standard symbols of the main stream, said first modified symbol being derived from said first standard symbol by a first additional phase shift corresponding to a negative angle $-\alpha/2$ if the current bit of the second stream is in one of the predetermined logical states TRUE or FALSE, or to a positive angle $+\alpha/2$ if the current bit of the second stream is in the other of said logical states where $\alpha$ is less as an absolute value than the minimum phase transition of the standard modulation, the negative sign and the positive sign being defined respectively as opposite and identical to the sign of the phase transition associated with said first standard symbol; and
  a second modified symbol is substituted for the second symbol of said pair of standard symbols, said second modified symbol being derived from said second standard symbol by a second additional phase shift, of modulus that is the same as but of opposite sign to, respectively, the modulus and the sign of said first additional phase shift.

Advantageously, $\alpha$ may be close to but still less than the peak phase error specified for the standard digital modulation.

In other embodiments, which can, if necessary, be combined:
  the first condition is satisfied for a pair of standard symbols only if the cumulative phase state prior to said pair concerned is the zero or initial cumulative phase state;
  the first condition is satisfied for a pair of standard symbols only if the phase transition associated with the first symbol of said pair has a predetermined sign, positive or negative;
  the first condition is satisfied for a pair of standard symbols only if these standard symbols belong to certain parts of one burst only, defined by distinguishing the training sequences from the payload sequences;
  the insertion method is implemented only intermittently;
  the first condition is satisfied for a pair of standard symbols only if a phase turn-around concerning this pair of standard symbols involves a non-minimum amplitude; and/or
  the first condition is assessed successively on non-overlapping pairs of consecutive symbols of the main stream.

A second aspect of the present invention relates to a method of extraction, from a stream of symbols transmitted in particular in radiofrequency form, of a secondary stream of binary information inserted using a method of insertion according to the first aspect. Said extraction method includes, for the detection of the presence of said secondary stream, the observation of the satisfying of the first condition to deduct from it at least one current bit of the secondary stream.

This extraction method is implemented at the demodulation stage. It is therefore to be applied in a demodulator.

In an embodiment, the extraction method includes the observation of phase turn-arounds, followed by the statistical estimation of the phase states of the standard symbols concerning these phase turn-arounds, then the detection of the presence of modified symbols in case of detection of significant phase shifts relative to said phase states.

In this case, for the extraction of a secondary information bit from a transmitted symbol stream, said bit can be set to said predetermined logical state in case of detection of the presence of modified symbols if, and only if, there is a change of the sign of the phase transitions respectively associated with a successive pair of modified symbols of said transmitted symbol stream.

As a variant, said bit is set to a predetermined one of said logical states in case of detection of the presence of modified symbols of a secondary information bit, according to the sign of the phase shifts detected.

A third aspect of the invention relates to a modulator for constructing a symbol stream to be transmitted from a main symbol stream of a standard digital modulation and a secondary stream of binary information. Said modulator includes means for implementing a method according to the first aspect.

A fourth aspect of the present invention relates to a demodulator for extracting a secondary stream of binary information from a symbol stream to be transmitted, constructed using an insertion method according to the first aspect. Said demodulator includes means for implementing an extraction method according to the second aspect.

A fifth aspect of the invention relates to a transmission device containing a modulator according to the third aspect and/or a demodulator according to the fourth aspect, or a plurality of them.

According to additional characteristics and advantages of the invention, considered in isolation or in combination:

- the symbols of the stream to be transmitted are standard symbols and modified symbols, derived from the standard symbols by the decision for additional shifts in the Fresnel plane;
- the modified symbols of the stream to be transmitted form pairs of symbols, the additional shifts of which are mutually reversed and for which the signs of the phase transitions are opposite;
- the phase trajectory induced by each of the symbols of the stream to be transmitted remains less than or equal to the maximum phase trajectory induced by the symbol alphabet of the standard modulation;
- the permanent insertion of the second stream statistically modifies fewer than half of the symbols of the first stream;
- the greatest phase trajectory according to the modified modulation is equal to the greatest phase trajectory of the standard modulation, with the optional constraint that the modified phase trajectory resulting from the method of inserting the second stream is, at all times, shorter than or equal to the standard phase trajectory of the first stream without insertion;
- the effect of the reduction of the minimum inter-symbol distance, due to the insertion, is lessened by particular properties of the configuration for insertion according to the proposed method, which can be used in the likelihood estimation at the demodulation level;
- the insertion method does not induce persistent phase errors on the main stream;
- the method is compatible with the demodulation of the first modified stream by the demodulator of a standard receiver, not suited to the method, that is, the method preserves interoperability between a transmitter implementing a modulation according to the invention with a receiver implementing a standard demodulation;
- the standard symbol alphabet is fully usable on implementing the method, no standard symbol is disregarded and there are, statistically, occurrences of all the standard symbols when the method is implemented;
- the method transmits only a single stream of symbols, the symbol rate of this stream is that of the main stream; this transmitted stream is fully usable for reconstructing the main stream;
- the method is not restricted to a particular sequence of certain symbols of the main stream; the main stream, supporting the insertion, can be considered a priori to be a stream of any symbols of the standard modulation;
- the secondary stream sent by the sending transmission device can contain binary information intended, for example, for the physical layer of the receiving transmission device or devices, and which includes or corresponds to technical parameters of the transmission, applicable immediately or imminently;
- the sequence of symbols of the stream to be transmitted can be encoded according to the criterion that requires the phase trajectory induced by each of the symbols of the resultant stream to remain less than or equal to the maximum phase trajectory induced by the symbol alphabet of the main stream.

Unlike in the prior art illustrated by document WO 02/096051, the method according to the invention makes no limiting assumptions as to its application to the symbols transmitted by the first stream. A higher rate for the secondary stream can be obtained, because the method according to the invention can be applied to all the symbols of the main stream. In particular, the method according to the invention is not restricted to pilot symbols of a synchronization sequence or to symbols of a training sequence included in the main stream. More generally, it is not restricted to a particular sequence of symbols from the main stream, known in advance or recognizable (by correlation, for example) by the receiver. Similarly, it is not limited time-wise to a frame header of the main stream, because the frames are multiplexed over long sequences of symbols.

It can furthermore be seen that the encoding of the symbols in the stream to be transmitted does not depend simply on the secondary stream and on the individual state of the phase transitions respectively associated with the symbols of the main stream. Indeed, this encoding also depends on the dynamic of the phase transitions of the main stream, beyond the phase transition of a current symbol of this stream. This is a fundamental difference compared to the prior art illustrated, for example, by the aforementioned U.S. Pat. No. 6,373,903. Furthermore, there is no need to first transform the secondary stream of binary information into a sequence of phase transitions, as is prescribed in this prior art.

The proposed method is also differentiated from the spread spectrum modulation techniques known from the prior art, in as much as the bit rate of the secondary stream can be of the same order of magnitude as that of the main stream and that it does not consist in a simple division of a single time-frequency space between two superimposed signals representing two different information streams.

BRIEF DESCRIPTION OF THE DRAWINGS

Other characteristics and advantages of the invention will become further apparent from reading the description that follows. The description is purely illustrative and should be read in light of the appended drawings in which.

DETAILED DESCRIPTION OF THE DISCLOSURE

Figure 1:
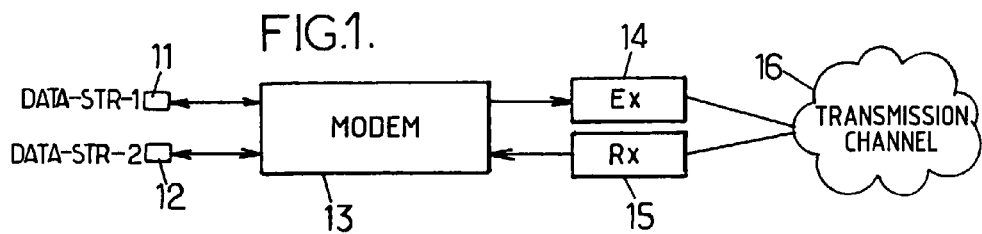
FIG. 1 is a functional diagram illustrating the principle of a modulator according to an aspect of the invention.

FIG. 1 shows a diagrammatic representation of a data transmission device suitable for implementing the invention.

The device comprises two binary data inputs/outputs 11 and 12. In a transmit operating mode, the inputs 11 and 12 respectively receive a first stream of binary information DATA_STR_1 and a second stream of binary information DATA_STR_2.

The data inputs 11 and 12 are coupled to matched inputs/outputs of a modulator/demodulator 13 (modem). The function of the latter, in a transmit operating mode, is to modulate the data that it receives from the inputs/outputs 11 and 12, so that it can be transmitted in a transmission channel 16 via transmission means 14, which comprise in particular a filter and a transmit amplifier. The other function of the modulator/demodulator 13, in a receive operating mode, is to demodulate the symbols received from the transmission channel 16 via reception means 15, which comprise in particular a filter and a receive amplifier, and to deliver the corresponding binary data to the inputs/outputs 11 and 12.

The modem 13 is based on an existing component, implementing a standard digital modulation, applied to the first stream of binary information DATA_STR_1. The stream of binary information DATA_STR_1 is then converted into a symbol stream of said standard digital modulation.

By convention, in the description that follows, the "first stream" is the main symbol stream of the standard modulation (derived from the stream DATA_STR_1), and the "second stream" is the secondary stream of binary information DATA_STR_2.

A standard modulation example is considered, as conventionally used in digital radio communication systems, such as the ternary continuous phase modulation (CPM) of modulation index h=⅛. M denotes the size of the symbol alphabet of this modulation, which can be used to transmit the main information stream. Here, M=8. In fact, there are commonly two alphabets of size M, one for the odd symbols and the other for the even symbols. The standard modulation on these alphabets defines, in the Fresnel plane, a constellation of standard states of the modulated signal as well as the transitions allowed between these standard states. This is a modulation with constant envelope, that is, with no amplitude modulation component.

Figure 2:
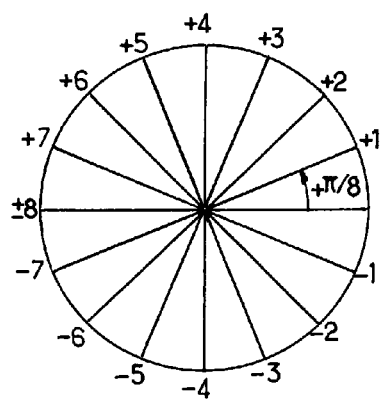
FIG. 2 gives the constellation in the Fresnel plane of a continuous ternary phase modulation, with a modulation index equal to $\pi/$.

FIG. 2 shows the usual representation of this constellation in the Fresnel plane, when the modulation is at constant amplitude. One out of every two symbols, for example the odd symbols, can take their respective values from the set $\{\pm 1, \pm 3, \ldots, \pm 7)\}$, and the others, namely the even symbols in this example, can take their respective values from the set $\{\pm 2, \pm 4, \ldots, \pm 8)\}$. Certain phase transitions can be prohibited, in particular those involving a zero phase transition. For example, the transitions between the symbol pairs ($\pm 1$, $\pm 7$) and ($\pm 3$, $\pm 5$) are prohibited. The maximum phase trajectory $\phi_{max}$ is equal to $7\pi/8$. The minimum phase trajectory $\phi_{min}$ is equal to $7\pi/8$.

Embodiments of the present invention use a modified modulation. This modified modulation is obtained from the standard modulation as follows.

The constellation of the standard modulation states is immersed in an extended constellation, using an extended alphabet containing standard symbols and non-standard symbols. The non-standard symbols of this extended constellation are called modified symbols. The non-standard states are called modified states. The Fresnel plane is provided with the decision distance associated with the standard demodulation (for example, Euclidian distance). When a standard state is the nearest neighbour state to a modified state, the two states form what is called a "twin star". This is why it is said that the modified modulation defines a "twin-star modulation".

By extending the symbol alphabet of the modulation, the maximum rate for information transmitted using the modified modulation is increased, in logarithmic proportion to the number of symbols added compared to the standard modulation. As will become more clearly apparent from the description that follows, this is, however, obtained without changing the symbol rate ("symbol-rate") of the transmissions.

There now follows a description of an example of how the modified symbols and the modified states are constructed, for the modified modulation, which gives the information stream to be transmitted.

A "symbol pair" of the standard modulation is understood to mean a pair comprising an even-numbered symbol and the consecutive symbol (therefore odd-numbered), in the sequence of symbols taken from the standard alphabet for the first stream.

The modulation method includes an encoding of the sequence of standard symbols corresponding to the main stream, by substituting modified symbol pairs for standard symbol pairs of the main stream, the occurrence of these substitutions being dependent on the secondary stream.

In other words, the secondary stream is inserted in the main stream at the modulation level. The term "stream to be transmitted" is used to mean the information stream resulting from this insertion.

The instantaneous rate of the secondary stream is assumed to be variable. We assume, in an embodiment considered here, that the raw average bit rate of the secondary stream is strictly less than half the symbol rate of the main stream. More precisely, in certain embodiments, the raw average bit rate of the secondary stream is statistically less than the proportion M/(2M−2) of the symbol pair rate of the main stream, which corresponds to the probability of symbol pairs having opposite phase signs on simultaneously taking two symbols from M symbols of the standard alphabet, as will be explained later.

If the standard modulation is a modulation involving a phase shift (phase shift keying, PSK), the concepts of phase shift and phase transitions considered in the present description are those of said standard modulation. This also applies to a modulation involving, non-exclusively, a possible phase transition between consecutive symbols, for example the QPSK-QAM (quadrature phase shift keying and quadrature amplitude modulation) family of modulations, or their variant OQPSK (offset-QPSK), or even a modulation defined on an array of points (Lattice modulation).

If the standard modulation is a differential modulation in which the symbols encode the phase transitions rather than the phase states, such as the DPSK (differential phase shift keying) or DQPSK (differential quadrature phase shift keying) modulation, a standard pair of symbols that will be considered is the one deriving from two consecutive standard differential encodings of the main stream.

If the standard modulation is a modulation involving a frequency shift (frequency shift keying, FSK), the frequency shift associated with a symbol can be represented here by the equivalent instantaneous phase of a complex exponential modulation, in accordance with a known representation in the field of angular modulations, where the instantaneous phase is linearly dependent on a primitive of the time function of the frequency shifts, and is observed at the decision instants.

In other embodiments applicable to modulations using only symbols with real values (that is, with no imaginary part in the Fresnel plane), but also to amplitude modulations or certain pulse modulations, a person skilled in the art will be able, if necessary, to transpose the method proposed below in the phase shift space to its equivalent in the amplitude shift space (amplitude shift keying, ASK). Either directly by replacing in the method the terms "phase", "angle" or PSK with the respective terms "amplitude", "length" or ASK, by geometrically interpreting that a phase transition is equivalent to a curvilinear abscissa shift on the circle of radius unity. Or indirectly by replacing in the complex plane the polar representation (amplitude, phase) with consecutive amplitude pairs forming an equivalent Cartesian representation (I/Q), the equivalence between a pair of amplitudes and a phase being provided, for example, by the arc tangent function.

The rest of the description therefore discusses only phases, angles and phase transitions to facilitate understanding through an intuitive geometric illustration, but without restricting the general nature of the method. The example of a ternary CPM modulation of modulation index h=⅛ will continue to be used, although this example is not limiting.

Without in any way restricting the general nature of the proposed method, we will assume that the secondary stream is an infinite stream of bits that can be in one of two predetermined logical states, TRUE or FALSE (corresponding, for example, to the respective binary values 1 and 0). By convention, in an embodiment, a long sequence of bits in the FALSE state will be deemed equivalent to the absence of any secondary stream to be transmitted for the time concerned; thus, the term secondary stream does not presuppose the permanent or intermittent, repetitive or aperiodic nature of the secondary information to be taken into account.

Figure 3:
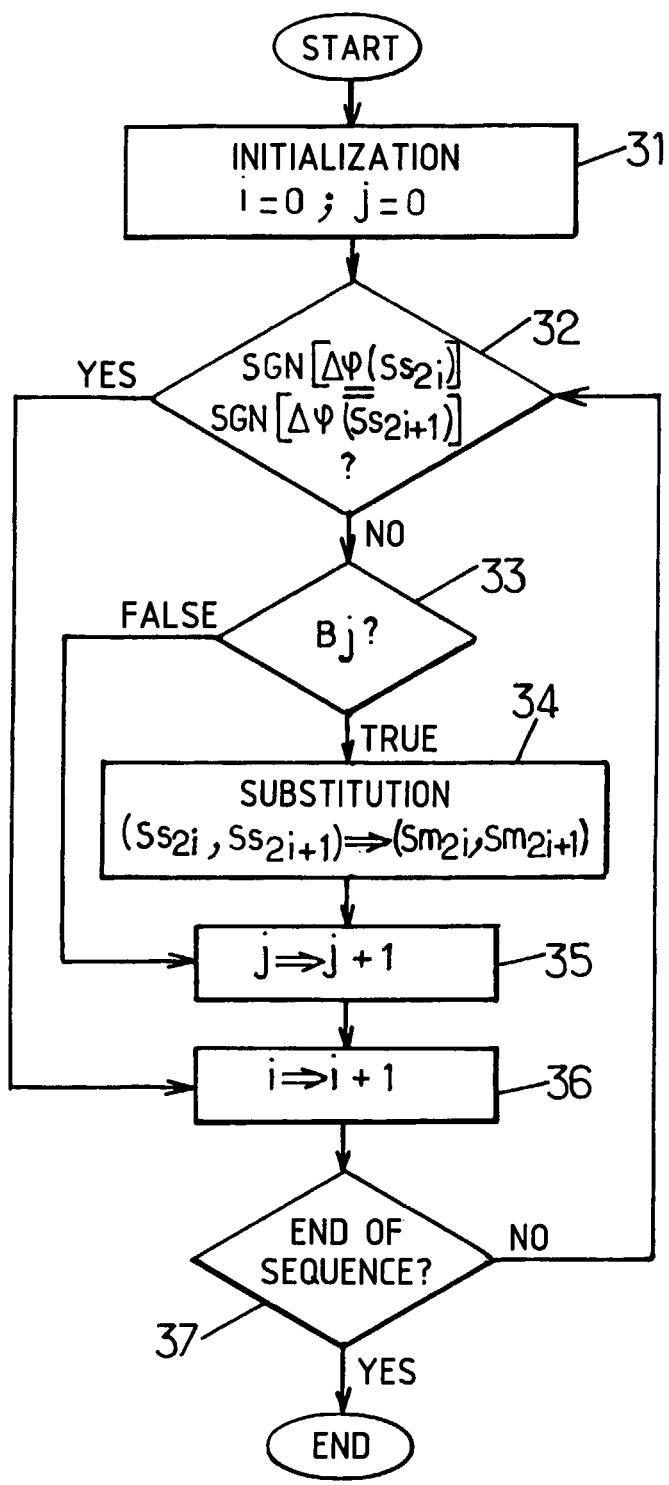
FIG. 3 is a diagram of steps of a first embodiment of the modulation method according to another aspect of the invention.

FIG. 3 is a diagram of steps of a first embodiment of the insertion method according to the present invention. Since the method is iterative, an integer index i is considered for the symbols of the main stream (first stream), and an integer j index for the bits of the secondary stream (second stream).

In an initialization step 31, the first pair of standard symbols of the main stream is produced. By convention, it is assumed that this pair is formed by the first two standard symbols denoted $Ss_{2i}$ and $Ss_{2i+1}$, with i=0, that is, the standard symbols numbers 0 and 1, respectively, of the sequence of symbols of the first stream. $(Ss_{2i}, Ss_{2i+1})$ denotes this pair of standard symbols. Furthermore, the first bit $B_j$ of the sequence of bits of the second stream is considered.

In a first test step 32, the occurrence of a condition on the pair of symbols $(Ss_{2i}, Ss_{2i+1})$ is estimated. To this end, the two successive phase transitions, respectively associated with this pair of standard symbols, are considered. The phase difference, in the Fresnel plane, between said symbol on the one hand, and the preceding symbol in the stream of symbols to which it belongs, on the other hand, is called phase transition associated with a predetermined symbol. In the figure, $\Delta\phi(Ss_{2i})$ and $\Delta\phi(Ss_{2i+1})$ denote the phase transitions respectively associated with the standard symbols $Ss_{2i}$ and $Ss_{2i+1}$. It will be noted that the phase transition $\Delta\phi(Ss_{2i})$ is the one that brings the phase state of the signal to be transmitted to that corresponding to the standard symbol $Ss_{2i}$, from that corresponding to the preceding symbol $Ss_{2i+1}$.

Figure 4:
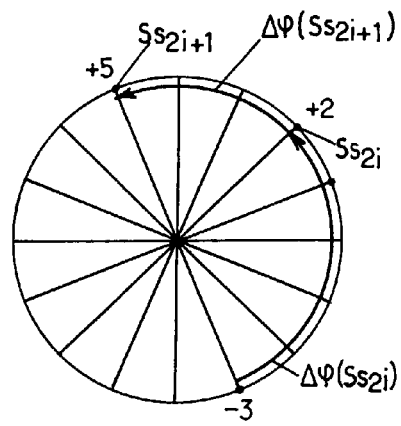
FIGS. 4 to 7 illustrate the principle of said first embodiment according to FIG. 3.

If the two phase transitions respectively associated with the standard symbols of the pair $(Ss_{2i}, Ss_{2i+1})$ have the same signs, that is, if $SGN[\Delta\phi(Ss_{2i})]=SGN[\Delta\phi(Ss_{2i+1})]$, where SGN denotes the "Sign" function, then the pair of standard symbols is unmodified. This configuration of the phase transitions is illustrated by the diagram of FIG. 4. In this figure, a pair of standard symbols $(Ss_{2i}, Ss_{2i+1})=(+2, +5)$ is considered, with a first phase transition $\Delta\phi(Ss_i)$ between the symbols −3 and +2, and a second phase transition $\Delta\phi Ss_{2i+4-1}$) between the symbols +2 and +5. The current bit $B_j$ of the secondary stream is retained for the next iteration on the pairs of standard symbols. There follows a direct skip to a step 36, where the next pair of standard symbols of the first stream is generated, by incrementing the index i.

If, however, the two phase transitions $\Delta\phi(Ss_{2i})$ and $\Delta\phi(Ss_{2i+1})$ respectively associated with the standard symbols of the pair $(Ss_{2i}, Ss_{2i+1})$ have opposite signs, there follows another test step 33. This configuration of the phase transitions is illustrated by the diagram of FIG. 4. In this figure, a pair of standard symbols $(Ss_{2i}, Ss_{2i+1})=(+4, +1)$ is considered, with a first phase transition $\Delta\phi(Ss_i)$ between the symbols −3 and +4 (which happens to correspond to the maximum phase transition $\phi_{max}$), and a second phase transition $\Delta\phi(Ss_{2i+4-1})$ between the symbols +4 and +1. There is a phase turn-around at the symbol $Ss_{2i+4-1}=+4$.

In the test step 33, the occurrence of a second condition, on the current bit $B_j$ of the secondary stream, is considered.

If the current bit of the secondary stream $B_j$ is in the logical state FALSE, the pair of standard symbols $(Ss_{2i}, Ss_{2i+1})$ is unmodified. This pair remains the pair (+4, +1). However, the next bit of the secondary stream must be taken into account for the next iteration on the pairs of standard symbols. This is the reason for the skip to a step 35, in which the index j is incremented. After the step 35, the step 36 follows, at which the index i is also incremented.

If, however, the current bit $B_j$ of the secondary stream is in the logical state TRUE, then, in a step 34, the pair of standard symbols $(Ss_{2i}, Ss_{2i+1})$ is substituted by a pair of respective modified symbols $(Sm_{2i}, Sm_{2i+1})$. It is the pair of modified symbols resulting from the substitution that is included in the stream to be transmitted, in place of the pair of standard symbols $(Ss_{2i}, Ss_{2i+1})$. It is therefore this resulting pair which is modulated into a signal transmitted over the transmission channel. Also, the next bit of the secondary stream becomes the bit to be taken into account in the next iteration on the pairs of standard symbols. This is the reason for the transition to the step 35, at which the index j is incremented. After the step 35, the step 36 follows, at which the index i is also incremented.

In all cases, after the step 36 for incrementing the index i, the possibility that the end of the sequence of standard symbols of the main stream has been reached must be investigated. If it has, the method is ended because bits of the secondary stream can no longer be inserted, even if there remains some to be transmitted. If not, the test step 32 is repeated, to determine whether there is a configuration of the pair of standard symbols that allows the insertion of the next bit of the secondary stream.

As will be understood, it is only when the two phase transitions of a pair of standard symbols have opposite signs, and only if the current bit of the secondary stream is in the TRUE state, that a symbol substitution is performed.

In other words, in an embodiment, the opportunity for a substitution is detected for a pair of symbols of the first stream characterizing a phase turn-around point in the Fresnel plane, and the effective substitution decision is conditional on the logical state of the current bit of the secondary stream.

Advantageously, the permanent insertion of the second stream therefore modifies, statistically, fewer than half of the symbols of the first stream.

The standard symbol alphabet is fully usable on implementing the modulation method, no standard symbol is disregarded and there are, statistically, occurrences of all the standard symbols when the method is implemented.

The method is designed to transmit only a single stream of symbols. The rate of this stream to be transmitted is that of the first stream. This stream to be transmitted can be used in full, at the receive end, to reconstruct the first stream, that is, the stream of standard symbols.

It will be noted that the method is not restricted to a particular sequence of certain symbols of the first stream, like a training symbol sequence or similar. The first stream, supporting the insertion of the bits of the second stream, can be considered a priori as a stream of any symbols of the standard modulation.

Figure 6:
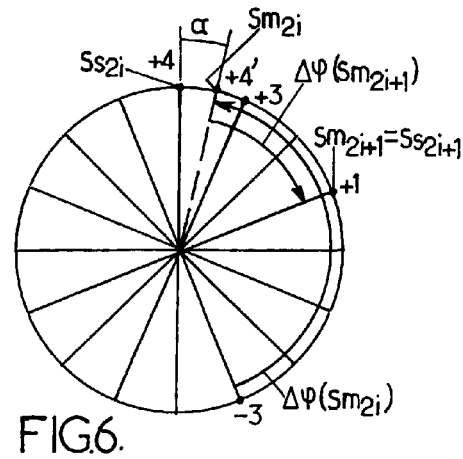

The diagram of FIG. 6 illustrates an example of generation of the pair of modified symbols $(Sm_{2i}, Sm_{2i+1})$ from the pair of standard symbols $(Ss_{2i}, Ss_{2i+1})$, in this case for $(Ss_{2i}, Ss_{2i+1})=(+4, +1)$, when the conditions for substitution are satisfied. In this embodiment, the substitution modifies the phase transitions associated with the symbols of the stream to be transmitted, compared to the phase transitions associated with the corresponding symbols of the main stream.

The first standard symbol $Ss_{2i}=+4$ of the pair is substituted by a modified symbol $Sm_{2i}=+4'$ which is derived from said first standard symbol by an additional shift in the Fresnel plane. In an embodiment, it may be a shift comprising a phase shift only (that is, no amplitude shift), and more particularly a negative angle $-\alpha$. The negative sign is defined as being opposite to the sign of the phase transition $\Delta\phi(Ss_{2i})$ associated with the first standard symbol $Ss_{2i}$ of the pair. In other words, the phase transition $\Delta\phi(Sm_{2i})$ associated with the first symbol of the pair of modified symbols is therefore reduced by $\alpha$ compared to that provided for by the standard modulation.

The second standard symbol $Ss_{2i+1}$ is replaced by a modified symbol $Sm_{2i+1}$ which is derived from said second standard symbol by the decision for a reverse additional shift in the Fresnel plane. In the embodiment envisaged in the preceding paragraph, it may be a shift comprising a phase shift by a positive angle $+\alpha$, the positive sign being defined as being identical to the sign of the first phase transition of the pair. In other words, the phase transition $\Delta\phi(Sm_{2i+1})$ associated with the second symbol of the pair of modified symbols is therefore reduced by $\alpha$ compared to that provided for by the standard modulation.

To preserve the possibility of a correct demodulation at the receiving equipment end by a standard demodulator, $\alpha$ is less than half of the minimum phase transition $\phi_{min}$ of the standard modulation, that is, $\alpha<\phi_{min}/2$, or even $\alpha<\pi/16$ in the example of the ternary CPM modulation of modulation index $h=\frac{1}{8}$.

Preferably, $\alpha$ is close to but still less than the peak phase error specified for the standard digital modulation. The result is that the method is compatible with the demodulation of the transmitted stream (corresponding to the first stream after modification resulting from the insertion of the second stream) by the standard demodulator of a receiving device, not particularly suited to the modulation method according to the present invention. This preserves total interoperability of the sending devices including a modified modulator with a market-standard receiving device including a standard modulator.

It will be noted that the reduction of the minimum distance between symbols due to the insertion, which can affect demodulation performance, is lessened by the particular properties of the insertion configuration. These properties can be used in the likelihood estimation at the demodulation level.

It will also be noted that the additional phase shifts act in the opposite direction to the phase shifts provided for by the standard modulation, therefore lessening the latter.

Thus, the greatest phase trajectory according to the modified modulation is at most equal to the greatest phase trajectory of the standard modulation. The modified modulation does not therefore degrade the spectrum of the radio signal which is actually transmitted, compared to the spectrum of the radio signal that would be transmitted if only the standard modulation were implemented.

Furthermore, the total of the additional phase shifts is equal to zero, for each pair of modified symbols of the stream to be transmitted. This is reflected in the fact that the phase state of the signal corresponding to the second modified symbol $Sm_{2i+1}$ is identical to that corresponding to the second standard symbol $Ss_{2i+1}$. The modulation method does not therefore induce any persistent phase error on the first stream.

Figure 7:
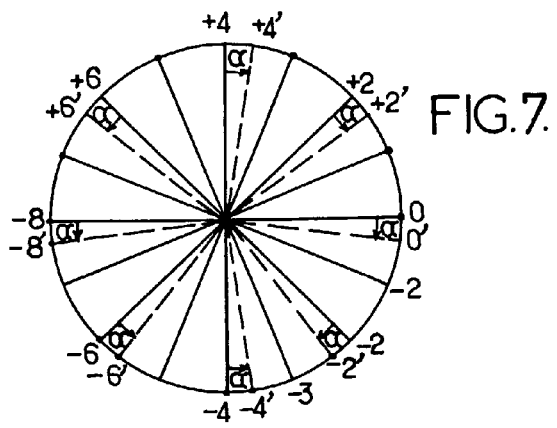

As an example, FIG. 7 gives all the phase states that can be accessed from an original phase state $-3\pi/4$ corresponding to the standard symbol $-3$. These phase states correspond to the "twin stars", each formed by a standard symbol $-4$, $-6$, $\pm 8$, $\pm 6$, $\pm 4$, $\pm 2$, $0$ and $-2$, and its corresponding modified symbols, respectively denoted $-4'$, $-6'$, $\pm 8'$, $\pm 6'$, $+4'$, $+2'$, $0'$, and $-2'$. Each time, the modified symbol is shifted phase-wise relative to the corresponding standard symbol by an angle $-\alpha$, the negative sign being defined as inverse to the phase shift associated with the standard symbol (starting from the original symbol $-3$).

Figure 8:
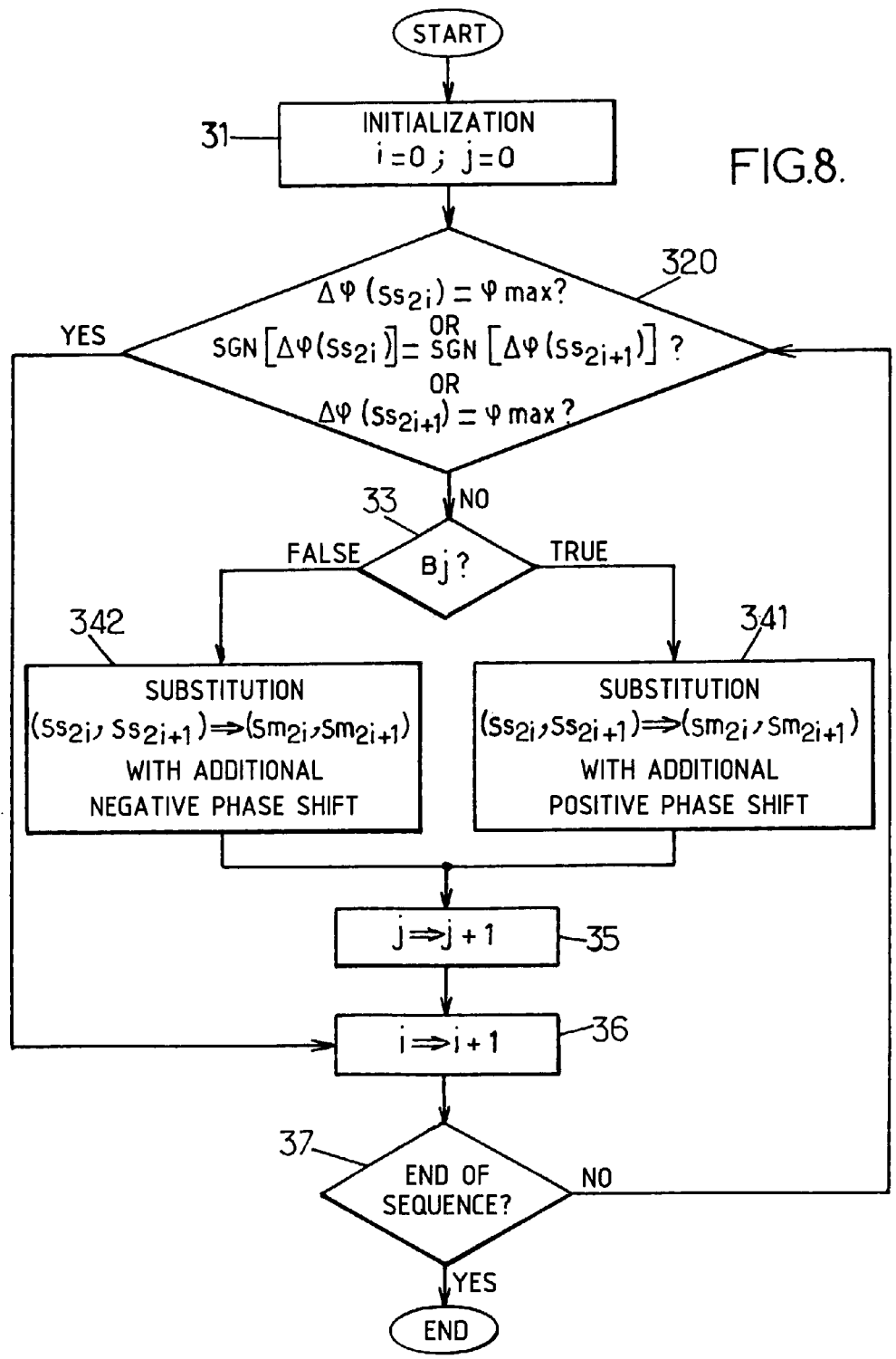
FIG. 8 is a diagram of steps of a second embodiment of the modulation method according to said other aspect of the invention; and, FIGS. 9 to 11 illustrate the principle of said second embodiment according to FIG. 8.

FIG. 8 is a diagram of steps of a second exemplary embodiment of the insertion method according to the present invention.

Certain steps according to this example are similar to steps of the first exemplary embodiment described above with reference to the diagram of FIG. 3, and are therefore given the same references. These are the initialization step 31, the step 33 for testing the second condition, the step 35 for incrementing the index j, the step 36 for incrementing the index i, and the step 37 for testing the end of the sequence of standard symbols. These common steps will not be described again here.

However, the step for testing the first condition 32 of the first embodiment is changed to a step 320, and the substitution step 34 is replaced by two separate steps 341 and 342. These steps 320, 341 and 342 of the second embodiment will now be described in detail.

In the test step 320, the occurrence of a first condition, on the pair of symbols $(Ss_{2i}, Ss_{2i+1})$, is estimated. For this, the two successive phase transitions, respectively associated with this pair of standard symbols, are considered.

Here, the first condition is three-fold. In practice, the first condition is satisfied when, at one and the same time, the phase transitions associated with the pair of consecutive standard symbols have opposite signs, on the one hand, and neither one nor other of these phase transitions is equal to the maximum phase transition of the standard modulation, on the other hand.

If the two phase transitions respectively associated with the standard symbols of the pair $(Ss_{2i}, Ss_{2i+1})$ have identical signs, that is, if $SGN[\Delta\phi(Ss_{2i})]=SGN[\Delta\phi(Ss_{2i+1})]$, where SGN denotes the "Sign" function, then the pair of standard symbols is unmodified. There is a phase turn-around. This configuration of the phase transitions is illustrated by the diagram of FIG. 4, already described with reference to the first embodiment. The current bit $B_j$ of the secondary stream is retained for the next iteration on the pairs of standard symbols. There then follows a direct skip to a step 36, at which the next pair of standard symbols of the first stream is generated, by incrementing the index i.

Figure 5:
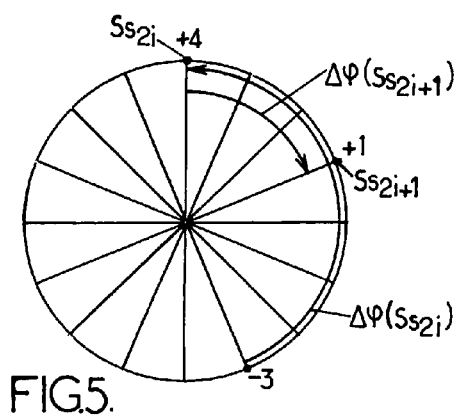

Furthermore, even in the event of a phase turn-around, there is also a direct skip to the step 36 if the phase transition $\Delta\phi(Ss_{2i})$ associated with the first standard symbol, or if the phase transition $\Delta\phi(Ss_{2i+1})$ associated with the second standard symbol, is equal to the maximum phase transition $\phi_{max}$ of the standard modulation. No symbol substitution then takes place for the current pair of standard symbols. An example of this configuration of the phase transitions is illustrated by the diagram of FIG. 5, already described above with reference to the first embodiment. In practice, the phase transition $\Delta\phi(Ss_{2i})$, in the case of this figure, is equal to $\phi_{max}=7\pi/8$.

Figure 9:
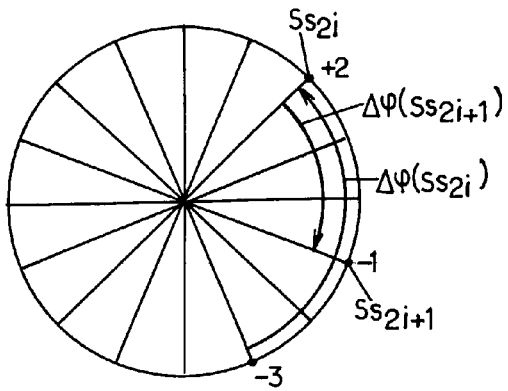

If, however, the two phase transitions $\Delta\phi(Ss_{2i})$ and $\Delta\phi(Ss_{2i+1})$ respectively associated with the standard symbols of the pair $(Ss_{2i}, Ss_{2i+1})$ have opposite signs, and if none of the phase transitions $\Delta\phi(Ss_{2i})$ and $\Delta\phi(Ss_{2i+1})$ is equal to $\phi_{max}$, the test step 33 follows. This configuration of the phase transitions is illustrated by the diagram of FIG. 9. This figure considers a pair of standard symbols $(Ss_{2i}, Ss_{2i+1})=(+2, -1)$, with a first phase transition $\Delta\phi(Ss_i)$ between the phase states corresponding to the symbols −3 and +2 (which is less than the maximum phase transition $\phi_{max}$), and a second phase transition $\Delta\phi(Ss_{2i+1})$ between the phase states corresponding to the symbols +2 and −1 (which is also less than the maximum phase transition $\phi_{max}$). There is a phase turn-around at the symbol $Ss_{2i}$=+2.

The substitution steps 341 and 342 are respectively performed when the bit $B_j$ is in the logical state TRUE and when it is in the logical state FALSE. In other words, this second embodiment is differentiated from the first embodiment in that a substitution of the standard symbols of the pair ($Ss_{2i}$, $Ss_{2i+1}$) takes place whatever the logical state of the bit $B_j$, provided that the (three-fold) condition on these standard symbols is satisfied.

In practice, when the first condition is satisfied, a first modified symbol $Sm_{2i}$ is substituted for the first standard symbol $Ss_{2i}$ of the pair of consecutive standard symbols ($Ss_{2i}$, $Ss_{2i+1}$), said first modified symbol being derived from said first standard symbol by a first additional phase shift corresponding to a negative angle −α/2 if the current bit $B_j$ of the second stream is in the logical state FALSE (step 342), or to a positive angle +α/2 if the current bit $B_j$ of the second stream is in the logical state TRUE (step 341). The angle α is less as an absolute value than the minimum phase transition of the standard modulation. The negative sign and the positive sign are respectively defined as opposite and as identical to the sign of the phase transition associated with the first standard symbol $Ss_{2i}$.

Furthermore, in the step 341, as in the step 342, a second modified symbol $Sm_{2i+1}$ is substituted for the second symbol $Ss_{2i+1}$ of the pair of consecutive standard symbols ($Ss_{2i}$, $Ss_{2i+1}$), said second modified symbol being derived from said second standard symbol by a second additional phase shift, of the same modulus as but opposite sign to, respectively, the modulus and the sign of said first additional phase shift. This sign is always defined with reference to the sign of the phase transition associated with the first standard symbol $Ss_{2i}$.

Figure 10:
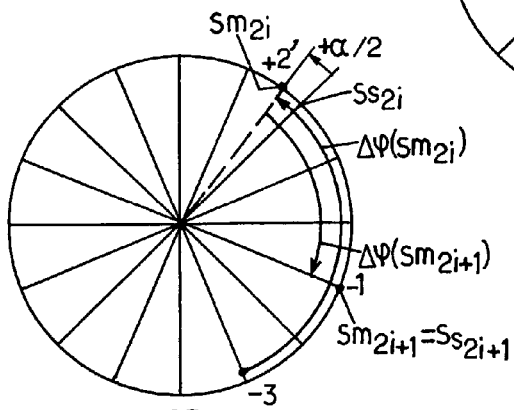

FIG. 10 illustrates an example of generation of the pair of modified symbols ($Sm_{2i}$, $Sm_{2i+1}$), from the pair of standard symbols ($Ss_{2i}$, $Ss_{2i+1}$), in this case for ($Ss_{2i}$, $Ss_{2i+1}$)=(+2, −1) when the conditions for substitution according to the step 341 are satisfied. In the embodiment, the substitution 341 also modifies the phase transitions associated with the symbols of the stream to be transmitted, compared to the phase transitions associated with the corresponding symbols of the main stream, by adding an additional phase shift.

More precisely, the first standard symbol $Ss_{2i}$=+2 of the pair is substituted by a modified symbol $Sm_{2i}$=+2' which is derived from said first standard symbol by an additional shift in the Fresnel plane. In an embodiment, it may be a shift comprising a phase shift only (that is, no amplitude shift), and more particularly by a positive angle +α. The positive sign is defined as being identical to the sign of the phase transition $\Delta\phi(Ss_{2i})$ associated with the first standard symbol $Ss_{2i}$ of the pair. In other words, the phase transition $\Delta\phi(Sm_{2i})$ associated with the first symbol of the pair of modified symbols is therefore increased by a compared to that provided for by the standard modulation.

The second standard symbol $Ss_{2i+1}$ is substituted by a modified symbol $Sm_{2i+1}$ which is derived from said second standard symbol by an additional shift in the Fresnel plane identical to that provided for by the first symbol of the pair. In the embodiment envisaged in the preceding paragraph, it is a shift comprising a phase shift by a positive angle +α, the positive sign still being defined as being identical to the sign of the first phase transition of the pair. In other words, the phase transition $\Delta\phi(Sm_{2i+1})$ associated with the second symbol of the pair of modified symbols is therefore also increased by α compared to that provided for by the standard modulation.

Figure 11:
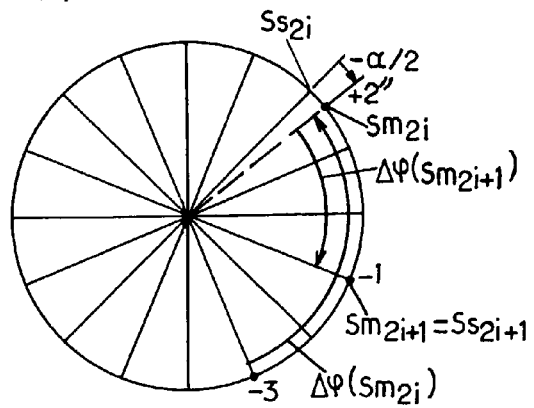

FIG. 11 illustrates an example of generation of the pair of modified symbols ($Sm_{2i}$, $Sm_{2i+1}$), from the pair of standard symbols ($Ss_{2i}$, $Ss_{2i+1}$), in this case for ($Ss_{2i}$, $Ss_{2i+1}$)=(+2, −1), when the conditions for the substitution according to the step 342 are satisfied. In the embodiment, the substitution 342 also modifies the phase transitions associated with the symbols of the stream to be transmitted, compared to the phase transitions associated with the corresponding symbols of the main stream, by adding an additional phase shift.

More precisely, the first standard symbol $Ss_{2i}$=+2 of the pair is substituted by a modified symbol $Sm_{2i}$=+2" which is derived from said first standard symbol by an additional shift in the Fresnel plane. In the embodiment considered here, it is a shift comprising a phase shift only (that is, no amplitude shift), and more particularly by a negative angle −α. The negative sign is defined as being opposite to the sign of the phase transition $\Delta\phi(Ss_{2i})$ associated with the first standard symbol $Ss_{2i}$ of the pair. In other words, the phase transition $\Delta\phi(Sm_{2i})$ associated with the first symbol of the pair of modified symbols is therefore reduced by α compared to that provided for by the standard modulation.

The second standard symbol $Ss_{2i+1}$ is substituted by a modified symbol $Sm_{2i+1}$ which is derived from said second standard symbol by an additional shift in the Fresnel plane identical to that provided for the first symbol of the pair. In the embodiment envisaged in the preceding paragraph, it is therefore a shift comprising a phase shift by a negative angle −α, the negative sign again being defined as being identical to the sign of the first phase transition of the pair. In other words, the phase transition $\Delta\phi(Sm_{2i+1})$ associated with the second symbol of the pair of modified symbols is therefore also reduced by α compared to that provided for by the standard modulation.

It will be noted that, also in this second embodiment, the greatest phase trajectory according to the modified modulation is no greater than the greatest phase trajectory of the standard modulation. The modified modulation according to the variant corresponding to the second embodiment described above does not therefore degrade the spectrum of the radio signal which is actually transmitted, compared to the spectrum of the radio signal that would be transmitted if only the standard modulation were implemented.

Furthermore, the total of the additional phase shifts is still equal to zero, for each pair of modified symbols of the stream to be transmitted. This is verified by the fact that the phase state of the signal corresponding to the second modified symbol $Sm_{2i+1}$ is identical to that corresponding to the second standard symbol $Ss_{2i+1}$. This variant of the method therefore again does not induce any persistent phase error on the first stream.

The insertion of a bit $B_j$, whether it is in the TRUE or FALSE state, implies an explicit substitution, which is why, in this variant, there is no standard symbol at the phase turn-around points.

The second embodiment of the method can be compared to the first embodiment. The two variants ensure an angular distance of α between modified symbols to be recognized and distinguished. The advantage of the variant according to the second embodiment concerns the standard demodulation by a standard receiver, because of the fact that the induced phase error (±φ/2) is equal to half of the average phase error in the first embodiment (α).

Because of the condition that none of the symbols of the pair of symbols to be modified involves the maximum phase trajectory of the standard modulation, the second embodiment ensures that the phase trajectory induced by each of the symbols of the resultant stream remains less than or equal to the maximum phase trajectory induced by the symbol alphabet of the main stream.

Another variant could be implemented by considering, at a current iteration, a pair of consecutive standard symbols, by applying, as appropriate, the two shifts described in the method, and by considering for the next iteration the pair formed by the symbol modified in the current iteration and the symbol that follows it, instead of considering pairs of separate symbols (because they are of even-odd numbers). Compared to this variant, the embodiments envisaged above do not require the shift acquired in the preceding step to be memorized and provide synchronization advantages for demodulation.

To sum up, in the first embodiment detailed above with reference to the step diagram of FIG. 3, the plurality of consecutive standard symbols is reduced to two such symbols, the second condition is applied to a current bit of the secondary stream, the additional shift in the Fresnel plane is a phase shift by a constant angle, and the substitution is applied to pairs of consecutive symbols.

In the different embodiment variants of the method, the symbol that creates the greatest phase trajectory is a standard symbol. This is why the method does not induce any degradation of the spectral properties of the signal following an increase in the modulation alphabet, which is to be deplored in the methods known from the prior art.

Note that, in the first embodiment, the phase trajectory according to the modified modulation is, at any time, shorter than the phase trajectory according to the standard modulation. Its path is equal in time to that of the standard modulation. The result is spectral reduction and power spectral density variation properties at the cost of negligible performance degradation in terms of bit errors regarding the main stream.

These properties have two consequences. On the one hand, it is possible to build a transmitter implementing a modified digital modulation, said modified digital modulation being derived from a standard modulation designed to transmit a main stream, the modification of the modulation being compliant with a method of inserting a secondary information stream into the main symbol stream of the standard modulation, and the transmitter being characterized in that its transmissions according to the modified modulation have a phase trajectory that is shorter than or equal to the phase trajectory of the standard modulation. On the other hand, the spectral reduction and power spectral density variation properties define a method of detecting the application of the insertion method to the pair of symbols, that is, detecting the presence of data of a secondary stream inserted in the main stream. The modulation classification methods, known from the prior art, can also be used for the detection.

It will be noted that the second stream of binary information DATA_STR_2 (FIG. 1) can be considered a priori as a stream of any binary information. It can be pseudo-random, that is, the method is not restricted to any particular binary sequence of the second stream. For example, unlike certain methods of the prior art, it is not restricted to a particular sequence of the second stream known in advance by the receiver. It is therefore not limited to a pattern that is repetitive or of finite length.

Preferably, the second stream of binary information DATA_STR_2 is encrypted, for example using a specific channel encoding. This channel encoding can be reinforced compared to that applied to the first stream of binary information DATA_STR_1, because the second stream of binary information DATA_STR_2 is more exposed than it to the transmission errors.

The second stream of binary information DATA_STR_2 sent by the sending transmission device can contain a transmitter identification. As a variant, or as a complement, it can be intended, for example, for use in the physical layer of the receiving device or devices, without involving mechanisms in the protocol layers above the physical layer. For example, it can contain technical parameters associated with the transmission (in particular the modulation applied at the current instant), applicable immediately or imminently, or even information announcing the change of modulation parameters, the change of channel encoding, the switchover between two modulations having different symbol times.

There now follows a description of the embodiments of the aspect of the present invention relating to a method of detecting the existence of a secondary information stream in a transmitted stream. This method is implemented in the receiving device, which receives a stream transmitted from a transmitting device.

It should be noted that the insertion is not periodic in time, and that the method of detecting, in a transmitted stream, the presence of information of a secondary inserted stream does not require any prior knowledge of the content of this secondary stream.

The detection method can include the observation of the power spectral density variations between the sub-sequences of standard symbols and the pairs of consecutive modified symbols inserted, compared to those, if any, of the known standard modulation.

A variant, which requires knowledge of $\alpha$ in the receiving device without, however, requiring any in-depth knowledge of the standard modulation, comprises the following steps:

acquiring the modulated signal, transmitted during a time window of a duration long enough in statistical terms, deducing from this the cumulative phase variations of the received signal;

estimating, where appropriate, the symbol rate and the decision instants;

detecting the positions of cumulative phase trajectory sign changes and measuring the local cumulative phase extremum;

performing a rough classification of the positions detected, for example by combining all the cumulative phases that are separate from each other by less than $3\alpha$ (3 times $\alpha$);

then calculating the average cumulative phase for each class containing enough observations; this average cumulative phase constitutes the estimation of a standard phase state of the standard modulation;

knowing $\alpha$, comparing the estimated standard phase states and the cumulative phase states observed for the phase sequence of the detected positions, in order to detect the deviations $\alpha$ and therefore the existence of the second stream.

In other words, the variant of the method of detecting the existence of the secondary stream includes the observation of the positions of phase trajectory sign changes, followed by the statistical estimation of the standard phase states associated with these positions, then the detection of the presence of phase shifts $\alpha$.

A third embodiment of the detection method includes the demodulation of the first stream in a way that will be detailed below, then remodulating the first likely stream and comparing it to the transmitted stream to detect the existence of modified symbols.

Now let us consider the point of view of the standard demodulator.

In a receiving device equipped with a standard demodulator, it is desirable for the value of $\alpha$ to be compatible with the filter associated with each standard symbol. The angle $\alpha$ can, for example, be considered as a local phase bias on the estimation of the wave vector, that is, on the estimation of the propagation channel, according to more or less delayed multiple paths. Naturally, in a transmission with non-zero $\alpha$, the demodulation of the second stream by a receiving device provided with a modified demodulator is actually more sensitive to the fading affecting symbols and to inter-symbol interferences than the demodulation of the first stream, since the minimum inter-symbol distance of the extended modulation is far smaller than the minimum distance in the standard modulation, because of the angular distance $\alpha$ between symbols of one and the same twin star. However, it is in fact the insertion positions chosen according to the method and their phase turn-around property that compensate for and facilitate the likelihood estimation of the demodulation of the second stream. Similarly, for a modified transmission subject to multiple paths and received by the standard receiver, the Voronoï packing radius of the twin stars of the constellation of the modified modulation could theoretically be greater than the Voronoï packing radius of the standard constellation, that is, greater than half the minimum inter-symbol distance of the standard modulation, which would make the decision on a phase state by the standard receiver more difficult. However, it is in fact the good properties of the method of constructing the twin stars and the choice of the value of $\alpha$ that facilitate the likelihood of the demodulation and limit the value of the Voronoï packing radius.

If $\alpha$ is greater than the phase error tolerance accepted by the standard demodulator, the pair of modified symbols is rejected or deleted by the standard demodulator. Now, by construction, there is a standard symbol which is the closest neighbour to a modified symbol. And since the modified symbols correspond to a phase turn-around point, the sequence estimation algorithm according to the maximum probability criterion (Viterbi or equivalent) overcomes the deletion and chooses the most likely pair of symbols, taking into account the phase turn-around, without there being any notable increase in the error rate of the modulation bits presented to the channel decoding module.

If $\alpha$ is less than the tolerance of the demodulator, the latter applies and demodulates the stars, by comparing modified symbols and standard symbols.

A potential heuristic for choosing $\alpha$ consists in choosing it according to the peak phase error acceptable by the standard modulation (for example $\pi/9$ for a frequency modulation with minimum phase gradient and upstream Gaussian filtering, called GMSK, short for Gaussian minimum shift keying, and in estimating an average of the resultant phase error over a sequence of several hundred transmitted symbols, according to the average insertion rate of the second stream.

Note that the average phase error added by the insertion method is very much less than $\alpha$. Thus, a standard demodulator, which is suited only to the standard digital modulation (unmodified), can demodulate the main signal transmitted according to the modified modulation. As a reminder, in a particular embodiment, the angle $\alpha$ is close to and within the peak phase error specified for the standard digital modulation.

The recovery of the secondary stream presupposes that a modified demodulator is built into the receiver to distinguish the points of the constellation that define a twin star. The angular inter-symbol distance to be distinguished is equal to $\alpha$. Note that, for certain standard modulations, the decision distance is greater than the angular distance, for example for linear modulations or modulations with non-constant amplitude.

The detection method described above can help in the demodulation process on recognition of the modified symbol, for example by comparing power spectral density estimators between the received signal, on the one hand, and the standard and likely modified symbols, on the other hand. Thus, the modified demodulator can extract the sequence of pairs of symbols from the extended symbol alphabet. Decoding is then applied to the modified symbol pairs received via the transmission channel.

A demodulation method according to a preferred embodiment comprises two steps:
  a first step involving comparing the modified symbol to the standard symbol of the same twin star, and reconstructing the main stream transmitted; then,
  a second step involving reconstructing the secondary stream by applying the following rules for each symbol pair occurrence interval:
    if there is a change of sign between the two phase transitions and if the paired symbols are likely to be modified symbols, the current bit of the secondary stream is then set to the logical state TRUE;
    if there is a change of sign between the two phase transitions, and if the symbols are likely to be standard symbols, the current bit of the secondary stream is then set to the logical state FALSE;
    if there is a change of sign between the two phase transitions, and if the symbols are likely to be neither a pair of standard symbols nor a pair of modified symbols, the current bit of the secondary stream is then in an indeterminate logical state;
    if there is no change of sign between the two phase transitions, there is no bit transmitted for the secondary stream, and, by convention, the current bit of the secondary stream is declared non-existent;
    if the possibility of a change of sign between the two phase transitions cannot be estimated, the current bit of the secondary stream is then in an indeterminate logical state or declared non-existent.

In other words, to summarize the first step, the method of demodulating the main information stream is such that it compares modified symbols, inserted in place of standard symbols, with the symbols of the standard modulation constellation that are the most likely, that is, it demodulates the twin stars.

Furthermore, to summarize the second step, the method of extracting a bit of the secondary stream from a received stream is such that the bit is to be set to the logical state TRUE if, and only if, there is a change of sign of the phase transitions for a pair of modified symbols of the received stream, and such that the bit is set to the logical state FALSE if, and only if, there is a change of sign of the phase transitions for a pair of standard symbols of the received stream.

It will be noted that, preferably, the demodulation of the first stream is thus performed first, which provides various advantages. In particular, the demodulation of the first stream can be performed over a finite sequence, then the first likely stream can be remodulated and subtracted from the received stream, which makes it possible to show the modified symbols using a received stream analysis technique based on synthesis of the first likely stream.

Thus, a receiving device provided with a modem suited to the implementation of the demodulation method according to the present invention can simultaneously demodulate the main stream and extract the secondary stream from a stream transmitted using the modified modulation, and repeat the decoding for each plurality (in particular, each pair, in the preferred example) of symbol times.

Alternatively, the prior extraction of a finite sequence of the second stream over more than two symbol times can be performed before demodulating the first stream.

Alternatively, again, a prior demodulation of a sequence (or a burst) of the first stream over more than two symbol times enables the second stream to be analysed in the received stream using a synthesis of the first likely stream.

Note that there are cases where the modified demodulator and its matched filters can be those of another conventional modulation (that is, another modulation well known in the state of the art), having more phase states but including all of the phase states and transitions of the standard modulation and of the modified modulation. The examples proposed below give such conventional modulations.

Note, finally that the changes of sign of phase transitions do not constitute a reliable means of synchronizing the modified demodulator and that any time shift by a symbol time of the receiver destroys the decoding of the second stream for a certain time.

However, from the point of view of the standard modulation, the extended alphabet consists in adding, to the standard alphabet $\{\pm 1, \pm 3, \ldots, \pm(M-1)\}$ of symbols that are not correlated with each other, a modified alphabet of symbols that are correlated with each other, in the sense that an even-numbered modified symbol is necessarily followed by a modified symbol of opposite sign and never a standard symbol. This is why the observation of two consecutive modified symbols followed by a standard symbol can be used to restore the synchronization of the sequences of pairs: said standard symbol is even-numbered.

Variants of the insertion method can be used to reduce the duly created phase states space.

In such a variant, the insertion method is implemented on a pair of symbols only if the cumulative phase state prior to the pair of symbols concerned is the zero cumulative phase state (or initial phase state). This facilitates the work of the standard demodulator and of the modified demodulator by reducing the demodulation uncertainty and the cumulative number of phase states. In practice, a phase shift observed at the same time as a change of sign of the phase transition, starting from a predetermined phase state, is likely to be the occurrence of the modified symbol close to the next phase state determined by the sign of the first phase transition.

In another variant, the method is implemented on a pair of symbols only if the phase transition linked to the first symbol of a pair has a positive sign. This facilitates the work of the standard demodulator and of the modified demodulator by reducing the demodulation uncertainty and the number of phase transitions. In practice: a phase shift observed at the same time as a change of sign of the phase transition, starting from a predetermined phase state, is likely to be the occurrence of the modified symbol close to the next phase state determined by the sign of the first phase transition.

In yet another variant, the method is implemented on a pair of symbols of the first stream if, and only if, the inter-symbol distance is not the minimum distance of the standard modulation.

A normal burst normally comprises payload symbols and predefined symbols forming one or more patterns characterizing synchronization and training. A synchronization burst also contains a pattern characterizing synchronization but with no explicit payload. A random access burst contains a short payload and a characteristic pattern.

This is why, in another variant, the method is implemented only in certain parts of a burst, by distinguishing the characteristic sequences from the payload sequences. In practice, the transmitter and the receiver know the phase transitions of a characteristic sequence for a given radio system, and the demodulator uses them as standard to control its synchronization and assess the degradation generated by the passage of the burst in the radio channel.

In a final variant, the method is implemented only intermittently, for example, in only certain bursts of a transaction.

The implementation of the method and of examples of resulting modulators-demodulators are illustrated below, in relation to various digital modulation families.

A 2-FSK modulator is modified according to the insertion method according to the present invention by substituting frequency-domain deviations equivalent to phase transition substitutions. The encoding procedure defines a symbol substitution by modified phase transitions with $\alpha=\pi/n$ and n>2. The modified demodulator must process a space with 12 states, that is $\{\pm 2/n, \pm(n-2)/n, \pm 1, \pm(n+2)/n, \pm 2(n-1)/n, \pm 2\}$, and with four pairs of transitions, that is $\{(1, 1), ((n-2)/n, -(n-2)/n), (-1, -1), (-(n-2)/n, (n-2)/n)\}$.

The method is immediately extended to any 4-FSK modulator.

A modified GMSK modulator, for example with $\alpha=\pi/8$ or $\pi/6$, can be associated with a continuous phase modulation (CPM) type modified demodulator, with ad-hoc Gaussian filter, of modulation index ha=$\alpha/\pi$, and an alphabet of sufficient size Ma>M, for example Ma=4.

The GMSK demodulator of a standard receiver will be capable of demodulating the signals sent with the modified modulations, which would theoretically increase its symbol error rate. However, in practice, the symbol errors due to the insertion method will all be likely to be cancelled on demodulation by searching for the maximum likelihood. In practice, in the particular case of the preceding GMSK modulation, the phase shift between the state preceding the pair of transitions and the state following this pair of transitions is $\pi$, $-\pi$ or zero, which facilitates the standard demodulation.

A C4FM modulation (compatible 4-ary frequency modulation), which is a quaternary continuous phase modulation of modulation index hs=¼, defined by the Telecommunication Industries Association (ANSI/TIA102.BAAA §9), can be modified in accordance with the insertion method according to the invention with a frequency deviation equivalent to $\alpha=\pi/12$ and a CPM type modified demodulator with ad-hoc raised cosine Nyquist filter, of modulation index ha=$\alpha/\pi$ and with an alphabet of sufficient size.

An F4FM modulation (filtered 4-ary frequency modulation), which is a quaternary continuous phase modulation of modulation index hs=⅓, proposed to the TIA (ANSI/TIA905), can be modified in accordance with the insertion method of the invention with $\alpha=\pi/9$ and a CPM type modified demodulator with ad-hoc filter, of modulation index ha=$\alpha/\pi$ and with an alphabet of sufficient size.

A π/4-DQPSK (π/4 differential quadrature phase shift keying) modulator can be adapted to the method, for example as follows: if the pair of standard symbols is (−3, +3) or (3, −3), the substitution is applied with $\alpha=\pi/12$. Otherwise, the substitution is not applied.

The method is applied directly, for example, to a BPSK (binary phase shift keying) or QPSK (quadrature phase shift keying) type phase shift modulator. It can also be directly transposed to an amplitude and phase modulator of the QAM (quadrature amplitude modulation) type, such as 16-QAM or 64-QAM, by choosing $\alpha$ according to the minimum angular distance between all the symbols of the QAM modulation concerned. According to an embodiment, the method is applied on a turn-around of the phase trajectory between consecutive symbols, independently of any amplitude variations.

According to another embodiment that can be applied to non-constant amplitude modulations, the first condition is satisfied only for phase turn-arounds concerning the pairs of standard symbols involving a non-minimal amplitude, that is, for example, the symbols associated with the peripheral points in the Fresnel plane, avoiding the symbols of the standard modulation alphabet for which the small amplitude would increase the impact of the increased phase error due to the insertion.

A multiple-carrier modulation, for example such as an OFDM (orthogonal frequency division multiplex) modulation, using frequency sub-carriers modulating signals, for example of QPSK and QAM types, can be adapted to the insertion method in such a way that the method is implemented on one or more sub-carriers with a phase deviation $\alpha$ dependent on the choice of the modulation and the size M of its alphabet.

The invention claimed is:

1. A method of inserting a secondary stream of information into a main stream of information, the method comprising
    inserting the secondary stream of information into the main stream of information to generate a stream to be transmitted;
    encoding a sequence of symbols of the stream to be transmitted includes
        substituting modified symbols for respective standard symbols when:
            a first condition on at least two consecutive symbols of the main stream of information is met; and
            a second condition on a current bit or a plurality of current bits of the secondary stream of binary information is met, and
        iterating to subsequent standard symbols when the first condition is met,
    wherein the main stream of information comprises standard symbols of at least one standard digital modulation, and the secondary stream of information comprises a secondary stream of binary information, and
    wherein said stream to be transmitted comprising a stream of modified symbols of a modified digital modulation, and having a same symbol rate as the main stream of information.

2. The method of insertion according to claim 1, wherein said stream of modified symbols are derived from said respective standard symbols by an additional shift in a Fresnel plane.

3. The method of insertion according to claim 2, wherein the additional shift in the Fresnel plane is a phase shift only.

4. The method of insertion according to claim 1, wherein the first condition is satisfied in case of a change in sign of phase transitions respectively associated with each symbol of a pair of consecutive symbols of the main stream of information.

5. The method of insertion according to claim 4, wherein, when the first condition is satisfied and when a current bit of the secondary stream of binary information is in a predefined one of the logical states TRUE or FALSE:
    a first modified symbol is substituted for a first standard symbol of the pair of consecutive standard symbols of the main stream of information, said first modified symbol being derived from said first standard symbol by an additional phase shift corresponding to a negative angle $-\alpha$, where $\alpha$ is less as an absolute value than a minimum phase transition of a digital standard modulation, a negative sign being defined as opposite to the sign of the phase transition associated with said first standard symbol; and
    a second modified symbol is substituted for a second standard symbol of said pair of standard symbols, said second modified symbol being derived from said second standard symbol by an additional phase shift of a positive angle $+\alpha$, the $\alpha$ positive sign being defined as identical to the sign of the phase transition associated with said first standard symbol.

6. The method of insertion according to claim 5, wherein $\alpha$ is close to and within a peak phase error specified for the standard digital modulation.

7. The method of insertion according to claim 4, wherein the first condition is satisfied when, at one and the same time, the phase transitions associated with the pair of consecutive standard symbols have opposite signs, and are not equal to the maximum phase transition of the standard digital modulation.

8. The method of insertion according to claim 7, wherein, when the first condition is satisfied:
    a first modified symbol is substituted for a first standard symbol of the pair of consecutive standard symbols of the main stream of information, said first modified symbol being derived from said first standard symbol by a first additional phase shift corresponding to a negative angle $-\alpha/2$ if a current bit of the secondary stream of binary information is in one of a predetermined logical states TRUE or FALSE, or to a positive angle $+\alpha/2$ if the current bit of the secondary stream of binary information is in another of said logical states, where $\alpha$ is less as an absolute value than the a minimum phase transition of the standard digital modulation, a negative sign and a positive sign being defined respectively as opposite and identical to a sign of the phase transition associated with said first standard symbol; and
    a second modified symbol is substituted for a second standard symbol of said pair of standard symbols, said second modified symbol being derived from said second standard symbol by a second additional phase shift, modulus of said second additional phase shift being identical to modulus of said first additional phase shift, and a sign of said modulus of said second additional phase shift being opposite to a sign of said modulus that of said first additional phase shift.

9. Method of insertion according to claim 8, wherein a is close to and within the a peak phase error specified for the standard digital modulation.

10. The method of insertion according to claim 4, wherein the first condition is satisfied for a pair of standard symbols only if a phase turn-around concerning said pair of standard symbols involves a non-minimum amplitude.

11. The method of insertion according to claim 4, wherein the first condition is assessed successively on non-overlapping pairs of consecutive symbols of the main stream of information.

12. The method of insertion according to claim 1, wherein the first condition is satisfied for a pair of standard symbols only if a cumulative phase state prior to pairing said pair of standard symbols is one of a zero cumulative phase state or an initial cumulative phase state.

13. The method of insertion according to claim 1, wherein the first condition is satisfied for a pair of standard symbols only if a phase transition associated with a first symbol of said pair of standard symbols has a predetermined sign, positive or negative.

14. The method of insertion according to claim 1, wherein the first condition is satisfied for a pair of standard symbols only if these standard symbols belong to certain parts of one burst only, defined by distinguishing the training sequences from the payload sequences.

15. The method of insertion according to claim 1, wherein the method of insertion is implemented only intermittently.

16. A method for insertion and extraction, the method comprising
   inserting a secondary stream of information into a main stream of information to generate a stream to be transmitted,
   wherein the main stream of information comprises standard symbols of at least one standard digital modulation, and the secondary stream of information comprises a secondary stream of binary information;
   encoding a sequence of symbols of the stream to be transmitted includes
      substituting modified symbols for respective standard symbols when:
         a first condition on at least two consecutive symbols of the main stream of information is met; and
         a second condition on a current bit or a plurality of current bits of the secondary stream of binary information is met, and
      iterating to subsequent standard symbols when the first condition is met,
   wherein said stream to be transmitted comprising a stream of modified symbols of a modified digital modulation, and having a same symbol rate as the main stream of information;
   transmitting the stream to be transmitted in radio frequency;
   extracting a stream of symbols from the transmitted stream by
   detecting a presence of said secondary stream of binary information; and
   observing a satisfying of the first condition and deducting from the stream of symbols transmitted in radio frequency form at least one current bit of the secondary stream of binary information.

17. The method of extraction according to claim 16, further including observing phase turnarounds, followed by statistically estimating phase states of standard symbols concerning these said phase turnarounds, then detecting the a presence of modified symbols in case of detection of significant phase shifts relative to said phase states.

18. The method of extraction according to claim 16, in which, for a demodulation of the main stream of information, said modified symbols, substituted in place of said respective standard symbols, are compared to the a standard symbol of a twin star.

19. A method of insertion a secondary stream of information into a main stream of information and extraction of a secondary information bit from a stream of symbols transmitted in radio frequency form, the method comprising
   inserting the secondary stream of information into the main stream of information to generate a stream to be transmitted;
   encoding a sequence of symbols of the stream to be transmitted includes
      substituting modified symbols for respective standard symbols when:
         a first condition on at least two consecutive symbols of the main stream of information is met; and
         a second condition on a current bit or a plurality of current bits of the secondary stream of binary information is met, and
      iterating to subsequent standard symbols when the first condition is met,
   wherein the main stream of information comprises standard symbols of at least one standard digital modulation, and the secondary stream of information comprises a secondary stream of binary information, and
   wherein said stream to be transmitted comprising a stream of modified symbols of a modified digital modulation, and having a same symbol rate as the main stream of information,
   wherein the first condition is satisfied in case of a change in sign of the phase transitions respectively associated with each symbol of a pair of consecutive symbols of the main stream of information,
   wherein, when the first condition is satisfied and when a current bit of the secondary stream of binary information is in a predefined one of the logical states TRUE or FALSE:
      a first modified symbol is substituted for a first standard symbol of the pair of consecutive standard symbols of the main stream of information, said first modified symbol being derived from said first standard symbol by an additional phase shift corresponding to a negative angle $-\alpha$, where $\alpha$ is less as an absolute value than a minimum phase transition of a digital standard modulation, a negative sign being defined as opposite to the sign of the phase transition associated with said first standard symbol; and
      a second modified symbol is substituted for a second standard symbol of said pair of standard symbols, said second modified symbol being derived from said second standard symbol by an additional phase shift of a positive angle $+\alpha$, the $\alpha$ positive sign being defined as identical to the sign of the phase transition associated with said first standard symbol;
   extracting of a secondary information bit from the stream of symbols by
   detecting a presence of said secondary stream of binary information, observing phase turnarounds, followed by statistically estimating the phase states of standard symbols concerning these phase turnarounds, then detecting a presence of modified symbols in case of detection of significant phase shifts relative to said phase states; and
   observing a satisfying of the first condition and deducting from the stream of symbols transmitted in radio frequency form at least one current bit of the secondary stream of binary information, wherein said bit is set to said predefined logical state in case of detection of the presence of modified symbols if and only if, there is a change of the a sign of the phase transitions respectively associated with a pair of successive modified symbols of said stream of symbols transmitted in radio frequency form.

20. A method of insertion and extraction of a secondary information bit from a stream of symbols transmitted in radio frequency form, the method comprising
   inserting a secondary stream of information into a main stream of information to generate a stream to be transmitted;
   encoding a sequence of symbols of the stream to be transmitted includes
      substituting modified symbols for respective standard symbols when:
         a first condition on at least two consecutive symbols of the main stream of information is met; and a second condition on a current bit or a plurality of current bits of the secondary stream of binary information is met, and iterating to subsequent standard symbols when the first condition is met, wherein the main stream of information comprises standard symbols of at least one standard digital modulation, and the secondary stream of information comprises a secondary stream of binary information, wherein said stream to be transmitted comprising a stream of modified symbols of a modified digital modulation, and having a same symbol rate as the main stream of information, wherein the first condition is satisfied in case of a change in sign of the phase transitions respectively associated with each symbol of a pair of consecutive symbols of the main stream of information, wherein the first condition is satisfied when, at one and the same time, the phase transitions associated with the pair of consecutive standard symbols have opposite signs, and are not equal to the maximum phase transition of the standard digital modulation, when the first condition is satisfied:

a first modified symbol is substituted for a first standard symbol of the pair of consecutive standard symbols of the main stream of information, said first modified symbol being derived from said first standard symbol by a first additional phase shift corresponding to a negative angle $-\alpha/2$ if a current bit of the secondary stream of binary information is in one of a predetermined logical states TRUE or FALSE, or to a positive angle $+\alpha/2$ if the current bit of the secondary stream of binary information is in another of said logical states, where $\alpha$ is less as an absolute value than the a minimum phase transition of the standard digital modulation, a negative sign and a positive sign being defined respectively as opposite and identical to a sign of the phase transition associated with said first standard symbol; and a second modified symbol is substituted for a second standard symbol of said pair of standard symbols, said second modified symbol being derived from said second standard symbol by a second additional phase shift, modulus of said second additional phase shift being identical to modulus of said first additional phase shift, and a sign of said modulus of said second additional phase shift being opposite to a sign of said modulus that of said first additional phase shift;

transmitting a stream of symbols in radio frequency form based on the stream to be transmitted;

extracting of a secondary information bit from the stream of symbols by detecting a presence of said secondary stream of binary information, observing phase turnarounds, followed by statistically estimating the phase states of standard symbols concerning these said phase turnarounds, then detecting a presence of modified symbols in case of detection of significant phase shifts relative to said phase states; and observing a satisfying of the first condition and deducting from the stream of symbols transmitted in radio frequency form at least one current bit of the secondary stream of binary information, wherein said bit is set to a predefined one of said logical states in case of detection of a presence of modified symbols of a secondary information bit, according to a sign of the phase shifts detected.

21. A modulator for constructing a symbol stream to be transmitted from a main stream of information and a secondary stream of information, the modulator comprising means for inserting said secondary stream of information into said main stream of information;

an encoder to encode a sequence of symbols of the symbol stream to be transmitted includes substituting modified symbols for respective standard symbols when:

a first condition on at least two consecutive symbols of the main stream of information is met; and a second condition on a current bit or a plurality of current bits of the secondary stream of binary information is met, and iterating to subsequent standard symbols when the first condition is met, wherein said main stream of information comprises standard symbols of standard digital modulation, and the secondary stream of information comprises the secondary stream of binary information, wherein said symbol stream to be transmitted results from the means for inserting the secondary stream of binary information into the main stream of information, and wherein said stream to be transmitted comprising a stream of modified symbols of a modified digital modulation, and having a same symbol rate as the main stream of information.

22. A system comprising a modulator constructing a symbol stream to be transmitted from a main stream of information and a secondary stream of information, the modulator comprising means for inserting said secondary stream of information into said main stream of information, wherein the main stream of information comprises standard symbols of at least one standard digital modulation, and the secondary stream of information comprises a secondary stream of binary information;

an encoder encoding a sequence of symbols of the stream to be transmitted includes substituting modified symbols for respective standard symbols when:

a first condition on at least two consecutive symbols of the main stream of information is met; and a second condition on a current bit or a plurality of current bits of the secondary stream of binary information is met, and iterating to subsequent standard symbols when the first condition is met, wherein said stream to be transmitted comprising a stream of modified symbols of a modified digital modulation, and having a same symbol rate as the main stream of information;

a transmitter transmitting the stream to be transmitted in radio frequency;

a demodulator to extract a secondary stream of binary information from a symbol stream of the transmitted stream, comprising means for extracting a stream of symbols from a transmitted stream by detecting a presence of said secondary stream of binary information; and observing a satisfying of the first condition and deducting from the stream of symbols transmitted in radio frequency form at least one current bit of the secondary stream of binary information.

23. A transmission device comprising:

a modulator for constructing a symbol stream to be transmitted from a main stream of information and a secondary stream of information, where the modulator comprising means for inserting said secondary stream of information into said main stream of information,
wherein said main stream of information comprises standard symbols of standard digital modulation, and the secondary stream of information comprises a secondary stream of binary information;
an encoder encoding of a sequence of symbols of the stream to be transmitted includes substituting modified symbols for respective standard symbols when:
  a first condition on at least two consecutive symbols of the main stream of information is met; and
  a second condition on a current bit or a plurality of current bits of the secondary stream of binary information is met, and
  iterating to subsequent standard symbols when the first condition is met,
wherein said stream to be transmitted results from the insertion of the secondary stream of binary information in the main stream of information, said stream to be transmitted comprising a stream of modified symbols of a modified digital modulation, and having a same symbol rate as the main stream of information.

24. A communication device comprising
a modulator constructing a symbol stream to be transmitted from a main stream of information and a secondary stream of information, the modulator comprising
  means for inserting said secondary stream of information into said main stream of information, wherein the main stream of information comprises standard symbols of at least one standard digital modulation, and the secondary stream of information comprises a secondary stream of binary information;
an encoder encoding a sequence of symbols of the stream to be transmitted includes substituting modified symbols for respective standard symbols when:
  a first condition on at least two consecutive symbols of the main stream of information is met; and
  a second condition on a current bit or a plurality of current bits of the secondary stream of binary information is met, and
  iterating to subsequent standard symbols when the first condition is met,
wherein said stream to be transmitted comprising a stream of modified symbols of a modified digital modulation, and having a same symbol rate as the main stream of information;
a transmitter transmitting the stream to be transmitted in radio frequency;
a demodulator to extract a secondary stream of binary information from a symbol stream of the transmitted stream, comprising
means for extracting a stream of symbols from a transmitted stream by
detecting a presence of said secondary stream of binary information; and
observing a satisfying of the first condition and deducting from the stream of symbols transmitted in radio frequency form at least one current bit of the secondary stream of binary information.

* * * * *